Patented Dec. 11, 1945

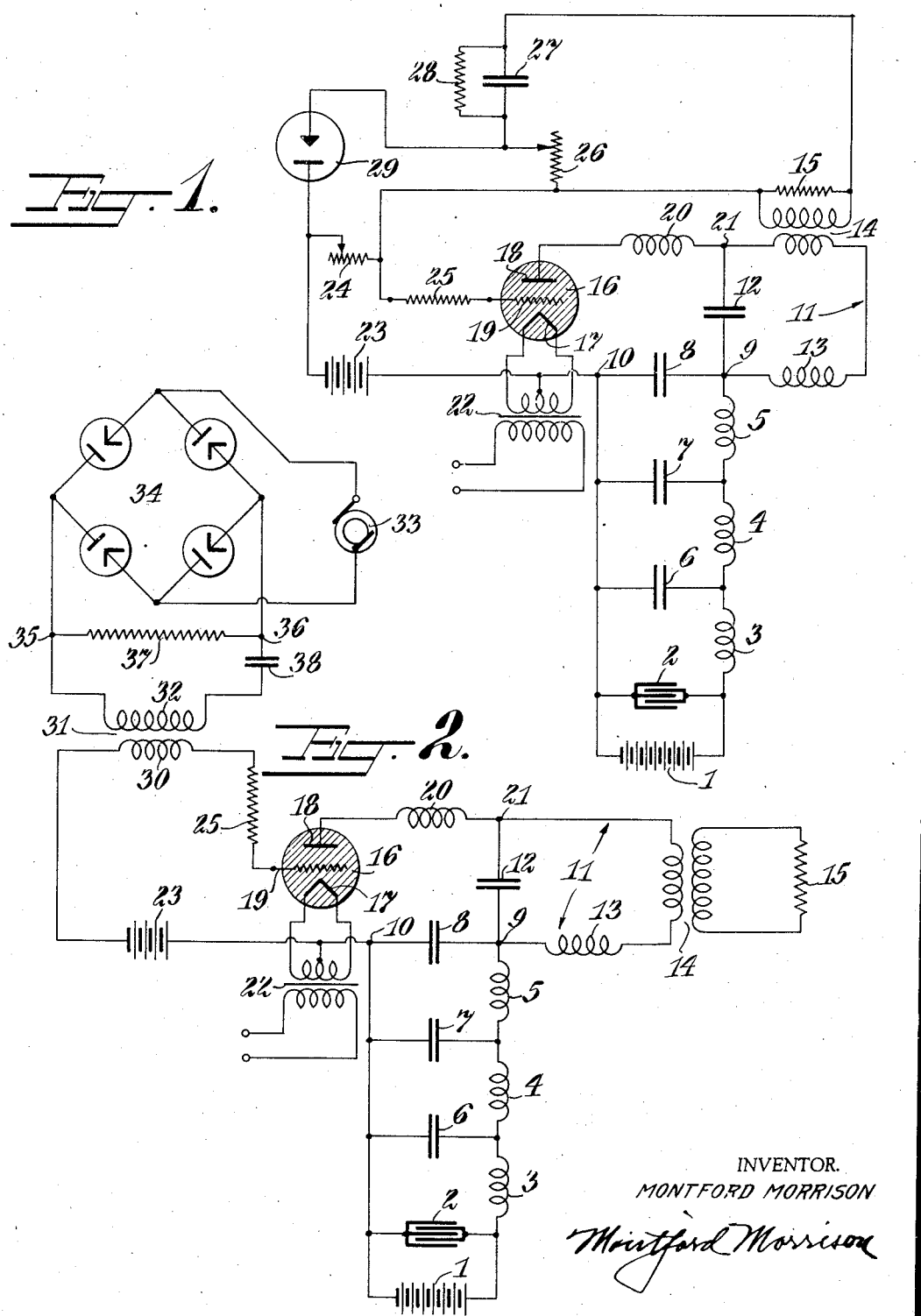

2,390,659

UNITED STATES PATENT OFFICE 2,390,659

OSCILLATION GENERATOR SYSTEM

Montford Morrison, Upper Montclair, N. J.

Substituted for abandoned application Serial No. 131,286, March 17, 1937. This application July 24, 1943. Serial No. 496,093.

3 Claims. (Cl. 250—36)

This invention relates to new and useful improvements in oscillation generator systems and means for controlling same, and particularly to systems which may be either self-excited or excited by an independent means without modification in the generator system proper.

This application is a substitute for a prior application, Serial No. 131,286, filed March 17, 1937.

Among the objects of my invention are to produce an oscillation system in which the ratio of the output energy to the control energy is a high value; to produce an oscillation system having a high degree of stabilization under self-excitation and at the same time one which is easily, and which may be definitely, controlled by an external source of periodic current; and to provide an arrangement in which the relative phase angle between the output wave and control current may be easily adjusted. Other and further objects will appear from the specification and the claims.

The invention will be more fully understood from the following description if read in connection with the accompanying drawing, Fig. 1 of which is a circuit diagram of an arrangement embodying the principles of the invention when self-excited;

Fig. 2 is a circuit diagram of an arrangement embodying the invention when external excitation is used.

Referring to Fig. 1, 1 is a source of direct current, 2 is a condenser shunted across said source, 3, 4 and 5 are series inductors cooperating with capacitors 6, 7 and 8 forming a low-pass filter between the direct current source 1 and the terminals of the capacitor 8. The terminal 9 of capacitor 8 is also the end terminal of the three inductors 3, 4 and 5, and the terminal 10 of capacitor 8 is also the negative terminal of the three filter capacitors 6, 7 and 8, the negative terminal of capacitor 2 and the negative terminal of the direct current source 1.

11 is the closed circuit of the oscillator proper having a capacitor 12, an inductor 13 and a transformer 14 loaded by translating device 15 for withdrawing alternating current from the closed circuit 11. 16 is any device which normally has a very high resistance between its main electrodes 17 and 18, but if a predetermined critical voltage is applied between two of the electrodes, for instance, 17 and 19, the resistance between the terminals 17 and 18 breaks down to a very low value. The particular structure of the device is of no importance. In the embodiment shown in Fig. 1 the device 16 is illustrated as a discharge tube having a filament 17, a control grid 19 and a plate 18 in a suitable gaseous atmosphere to give the critical breakdown characteristic above specified. Tubes of this character and containing mercury vapor are known as "grid glow" tubes and "thyratrons," and tubes with three simple cylindrical electrodes are sometimes called "trigger" tubes.

In the plate circuit of the critical break-down device 16 an inductor 20 is connected to the oscillatory circuit 11 at terminal 21. Terminal 10 is connected to the center of a filament transformer 22 which supplies filament energy for the tube 16. 23 is a source of voltage for biasing the grid 19 through variable resistor 24 and fixed resistor 25. The load 15 of transformer 14 is shunted by a circuit including a variable resistor 26 in series with a capacitor 27 shunted by a resistor 28. The variable resistor 26 is shunted by a rectifying device 29 in series with the variable resistor 24.

Certain elements of Fig. 2 which are identical with those of Fig. 1 have the same numbers, the circuits of the two figures being identical with the exception of the grid control circuit which will now be described. The grid bias potential source 23 is connected through the secondary 30 of a transformer 31 to the fixed resistor 25. The characteristics of transformer 31 depend upon the frequencies involved, the only requirement being that the voltage wave form which is impressed upon the primary 32 be reasonably well transmitted to the secondary 30.

33 is a source of alternating current and 34 is a conventional bridge type full wave rectifier impressing upon the terminals 35 and 36 of resistor 37 a pure full wave rectified voltage. The resistor 37 and series capacitor 38 constitute a parallel feed input for the transformer 31.

The main oscillating circuit comprise 11, 12, 13, 14, such equivalent resistance as transformer 14 may possess, together with such other inherent resistance as may be found in the circuit.

In the illustrated embodiment large amounts of power may be withdrawn from the oscillating circuit through the transformer. However, much more easily stabilized oscillation may be obtained by increasing the Q of circuit 11 to a very high value, using this circuit as a master oscillator driving a slave circuit as is commonly understood in the art.

It has been shown in Morecroft's "Principles of Radio Communication," third edition, page 338, that in a closed oscillating circuit supplied by energy from a single direct current impulse, that the form of the wave train in this closed circuit resulting from said single impulse of excitation is affected by the duration of the impulse.

In accordance with the present invention, not the form of the wave train is the determining factor, but the quantity of energy in the impulse of excitation that is delivered to the circuit. This is limited by the fact that the impulse cannot have a duration beyond a certain value and is, in fact, limited to one-half the duration of a cycle of the natural period of the oscillating circuit.

In practicing the present invention the impulse circuit should not deliver a square top wave form because capacitors that must be used in the oscillating circuit would by-pass high current values, whereby the grid-controlled valve device that I use would be called upon to operate beyond the capacity of the usual commercial device available for this purpose. I provide a low-pass filter in the input circuit of my oscillator to prevent the supplying of square top waves to the circuit which contains the capacitor. This low-pass filter, together with the other inductances and capacitances in the circuit, will determine the period of time during which the open circuit will be closed and thus the impulsing period which, in accordance with the present invention, should never be more than one-half, but may be less than one-half, the natural frequency of the normally closed oscillating circuit.

In accordance with my invention I provide means for supplying the energy loss per cycle in circuit 11 cyclically, such that the current produced in circuit 11 is in fact an alternating current showing no detrimental decrement effects.

Referring to Fig. 2, the alternating voltage from generator 33 is rectified by full wave bridge circuit 34 and impressed upon terminals 35 and 36 of resistor 37, which with capacitor 38 form a parallel feed input circuit for transformer 31. This will impress in the grid circuit of the critical breakdown device 16 a full wave rectified alternating current. The device 16 has such characteristics that with a negative potential upon the grid 19 above a given critical value, no conduction current between electrodes 17 and 18 will occur with normal plate voltage applied to the device. The constant potential source 23 plus the added voltage of the secondary 30 is such that the minimum critical negative potential of the grid 19 is always exceeded except at the zero points of the rectified voltage received from the secondary 30.

Under these conditions the critical break-down device 16 is ignited or triggered off only at these zero points and under conditions of proper operating voltage between the electrodes 17 and 18.

Assuming that the grid potential of the critical breakdown device 16 is away from the said zero points, the device 16 will not conduct current. When the zero point is reached the resistance of tube 16 breaks down and current begins to flow from potential source 1, the capacitor 2 being provided merely to store energy so that the instantaneous capacity of source 1 may be small. The current flows through the filter circuit, the impulse energy dividing at the terminal 9, one part passing through the capacitor 12 and inductor 20, and the remaining part passing through the inductor 13, transformer 14, combining with the other current through the inductor 20 and completing its circuit through the critical break-down device 16 to terminal 10 of the power supply circuit.

The division of energy storage between the capacitor 12 and the inductor 13 will depend upon the constants of these two elements and the characteristics of the filter circuit between terminals 9 and 10 and the direct current source 1. The low-pass filter circuit has further property of limiting the maximum value of the current through the critical break-down device 16.

Inductor 20 in cooperation with its coupled elements constitutes a second oscillator circuit having a period which is fixable and is independent of the circuit 11.

The device 16 has the further property of extinguishing its conductivity when the discharge current between its main electrodes approaches zero, so that for a single ignition voltage upon the electrode 19, the duration of which does not exceed a small fraction of the period of oscillation in the main electrode circuit thereof, the conductivity of the device 16 will exist for only one lobe of the oscillation current. The circuit 11 will, therefore, receive a unidirectional energy impulse for each momentary excitation of the control electrode 19 of device 16.

With a fixed voltage at the source 1, the characteristics of the filter circuit in conjunction with the two coupled oscillator circuits provides for a definite measure of impulse energy supplied per cycle to circuit 11. With a properly predetermined wave form of impulse current of proper duration, the impulse energy periodically supplied to circuit 11 at the beginning of each cycle will eliminate the decrement effect and circuit 11 will oscillate as a continuous sine wave of current if the oscillator frequency of circuit 11 is adjusted approximately to twice that of the alternating current generator 33 so that the critical breakdown device 16 receive two ignition points per cycle of the current from generator 33.

The natural frequency adjustment of circuit 11 is not critical and the current in circuit 11 will follow in phase and frequency within reasonable variations of these two quantities in alternating current generator 33. The current in circuit 11 will flow cyclically, since the oscillations become forced whenever the frequency of the igniting circuit is different from the natural period of the circuit. This is so because when the grid control circuit frequency is increased slightly, the "losses" are replaced in circuit 11 before they have been actually dissipated, whereby more energy is supplied to the oscillating circuit than it can dissipate at its normal frequency. The circuit must, therefore, operate faster to absorb the losses.

The generator effect of such an igniting circuit will be better appreciated if one bears in mind that during each cycle the losses are supplied to the oscillating circuit at the igniting point of the control circuit, and that this tends to force the oscillations into following the variations at this point, provided, of course, that the variations are not too great. Since critical breakdown devices such as 16 have heavy plate currents and almost infinitesimal grid currents, large amounts of oscillating currents may be obtained by this invention with a reasonably small tube.

When it is desired to have the oscillating circuit 11 self-excited, an exciting circuit of the characteristics shown in Fig. 1 may be employed. While an oscillator can be set into operation by one of more switchings in the circuit, its operation can be most easily understood by considering the circuits already in operation.

The voltage across the resistor 15 during operation is sinusoidal and the current through the variable resistor 24 is fixed mainly by the constants of the capacitor 27, its shunting resistor 28, rectifier 29, and the resistance value of 24, resistor 26 serving merely to by-pass certain undesirable currents. The current through resistor 24 is limited to unidirectional values by the rectifier 29. The value and the shape of the unidirectional current through resistor 24 is largely determined by the value of the capacitor 27 which is so fixed that in conjunction with the other elements of the circuit a steep wave front of current is produced through the resistor 24 at the beginning of each cycle of the voltage at 15, and only at this point. At the beginning of each new cycle in the oscillation circuit, the critical break-down device 16 is ignited by means of grid 19 by a very steep wave front voltage, producing a system of self-excitation determined by the frequency of the oscillating circuit 11, the other factors being as before described.

Referring to Fig. 2, with a fixed voltage source 1 the only important variables in circuit 11 are the loading and temperature effects, the temperature effects being in reality a change of loading.

The frequency stability of such a circuit can be made of very high value by using the above mentioned master oscillator and slave circuit and by employing temperature compensated resistance circuits or controlling the temperature of the circuits in which variation in resistance is a factor, as well as employing a critical break-down device for the element 16 which is not detrimentally subject to important variations.

The expression "electron discharge means" is used herein as a general term to designate all those means which are characterized by employing "electron discharge" as differentiated from mechanical contactors.

The expression "closed metallic circuit" in the claims is used to designate a circuit composed entirely of metallic conductors or their equivalent as distinguished from closed circuits which contain electron discharge tubes or their equivalents.

The herein described embodiments are merely given as practical cases, such circuits being capable of satisfactory operation with relatively large outputs of energy, but it will be obvious that the principles herein disclosed may be embodied in many other organizations widely different from those illustrated without departing from the spirit of the invention as defined in the claims.

What I claim is:

1. An oscillation generator system comprising a closed circuit having a given natural frequency, a normally open circuit coupled with said closed circuit and when closed having a higher natural frequency than the given natural frequency, a direct current source of electric power coupled with said open circuit, and means for closing said normally open circuit for an interval of time equal to one-half the natural period of the open circuit when closed, thereby impulsing the said closed circuit for the said one-half period of time.

2. An oscillation generator system comprising a closed circuit having a given natural frequency, a normally open circuit coupled with said closed circuit and when closed having a higher natural frequency than the given natural frequency, a direct current source of electric power coupled with the open circuit, and means for closing said normally open circuit for an interval of time equal to one-half the natural period of this circuit when closed, said interval of closing occurring periodically at a frequency substantially that of the given natural frequency, thereby impulsing the said closed circuit for the said one-half period of time.

3. An oscillation generator system comprising a closed circuit having a given natural frequency, a normally open circuit coupled with said closed circuit and when closed having a higher frequency than the given natural frequency, a direct current source of electric power coupled with said open circuit, and means for closing said normally open circuit for an interval of time equal to not more than one-half the natural period of the open circuit when closed, thereby impulsing said closed circuit for a period not more than one-half the period of its given natural frequency.

MONTFORD MORRISON.